United States Patent
Roy et al.

(10) Patent No.: US 10,342,079 B1
(45) Date of Patent: Jul. 2, 2019

(54) FILTER LED LAMP ARRANGEMENT

(71) Applicant: SILICON HILL B.V., Amsterdam (NL)

(72) Inventors: Shounak Roy, Maarssenbroek (NL); Martijn Jeroen Dekker, Groningen (NL)

(73) Assignee: Silicon Hill B.V., Amsterdam (NL)

( * ) Notice: Subject to any disclaimer, the term of this patent is extended or adjusted under 35 U.S.C. 154(b) by 0 days.

(21) Appl. No.: 16/116,983

(22) Filed: Aug. 30, 2018

(30) Foreign Application Priority Data

Jul. 26, 2018 (EP) .................................... 18185779

(51) Int. Cl.
*H05B 33/08* (2006.01)
*H05B 37/02* (2006.01)

(52) U.S. Cl.
CPC ....... *H05B 33/0815* (2013.01); *H05B 33/089* (2013.01)

(58) Field of Classification Search
CPC .......................... H05B 33/0815; H05B 33/089
USPC ......................................................... 315/291
See application file for complete search history.

(56) References Cited

U.S. PATENT DOCUMENTS

| | | | |
|---|---|---|---|
| 9,543,847 B2 * | 1/2017 | Karlsson | H02M 3/158 |
| 9,730,289 B1 * | 8/2017 | Hu | H05B 33/0845 |
| 9,913,336 B2 | 3/2018 | Aiming Xiong et al. | |
| 2009/0195184 A1 * | 8/2009 | Van Der Wal | H05B 33/0815 315/294 |
| 2013/0082662 A1 * | 4/2013 | Carre | H02J 7/0052 320/134 |
| 2014/0368118 A1 * | 12/2014 | Bhardwaj | H05B 33/0815 315/175 |
| 2016/0234902 A1 * | 8/2016 | Liu | H05B 33/0815 |
| 2017/0290117 A1 * | 10/2017 | Linnartz | H05B 33/0815 |
| 2017/0370534 A1 | 12/2017 | Aiming Xiong et al. | |
| 2019/0044434 A1 * | 2/2019 | Elferich | H02M 1/08 |

FOREIGN PATENT DOCUMENTS

WO 2017186723 A1 11/2017

\* cited by examiner

*Primary Examiner* — Don P Le
(74) *Attorney, Agent, or Firm* — Hoyng Rokh Monegier LLP; David P. Owen (57) ABSTRACT

An LED lamp suitable for use in a luminaire, the LED lamp adapted for receiving electrical power from the luminaire and comprising: one or more LEDs; a ballast protection circuit including an impedance; a filter circuit; a switched-mode power supply for driving the LEDs; one or more sensing circuits for generating at least one output, in dependence on whether the electrical power received from the luminaire indicates that the electrical power is generated via a magnetic ballast, an electronic ballast which operates as a constant current ballast, an electronic ballast which operates as a constant power ballast, or not via a ballast; and a plurality of switches for defining a plurality of operation modes of the LED lamp, and for switching among the plurality of operation modes in dependence on the at least one output of the sensing circuits.

19 Claims, 5 Drawing Sheets

FILTER LED LAMP ARRANGEMENT

TECHNICAL FIELD

The invention relates generally to light emitting diode (LED) lamps and LED lighting, and more particularly to LED lamps suitable to replace a fluorescent lamp in a luminaire having a ballast for use with fluorescent lamps.

BACKGROUND

Fluorescent lighting has been around for many years now. This form of lighting started out as a highly efficient alternative for incandescent light bulbs, but has recently been surpassed by LED lighting in terms of efficiency and power consumption, and also in other aspects as set out below.

Fluorescent lamps generally comprise a tube filled with an inert gas and a small amount of mercury, capped at both ends with double pinned end caps. The end caps contain a glow wire to preheat the gasses inside the tube and to vaporize the mercury in order to assist with ignition of the fluorescent lamp. After the user turns on a main switch (e.g. a wall switch or a cord switch on the ceiling), the fluorescent lamp is ignited, and heat generated by the conducted current keeps the fluorescent lamp in operational condition. To facilitate these starting conditions and to limit current through the fluorescent lamp during operation, and thus limit the power consumed, a ballast is usually fitted in the fluorescent luminaire, connected between the mains power supply and the fluorescent lamp, and power is supplied to the lamp via the ballast.

When first introduced, the only available ballasts were simple inductive or reactive elements placed in series with the power supply to the fluorescent lamp, which limit consumed power by limiting the AC current as a result of the frequency dependent impedance of the inductor. An undesirable result is a relatively low power factor and relatively high reactive power. These types of ballasts are usually referred to as magnetic ballasts.

More recently other types of ballasts have been introduced, such as electronic ballasts. These ballasts usually first convert AC mains power into DC power, and subsequently convert the DC power into high frequency AC power to drive the fluorescent lamp.

Electronic ballasts can further be categorized into two types: constant current ballasts and constant power ballasts. Most electronic ballasts are constant current ballasts, designed to deliver current at a substantially constant amplitude. These ballasts can be modelled as a constant AC current source. These ballasts typically comprise a self-protection/self-correcting mechanism to avoid potential problems of maintaining a constant current. A constant power ballast is designed to deliver substantially constant power and the output current will vary depending on the load to attempt to maintain the design power output. If the operating power is below the design output level, constant power ballasts usually try to increase the output current to come closer to the design power level.

LED lamps are more efficient than fluorescent lamps, and have many other advantages. For example, no mercury is required for LED lamps, the light output from LED lamps is more directional, power can be more easily control or regulated, and the lifetime of LEDs is generally much longer than fluorescent lamps. Thus, replacing fluorescent lamps with LED lamps is often desirable, and it is also desirable to be able to fit replacement LED lamps into existing luminaires designed for fluorescent lamps without needing to modify the luminaire. However, an LED lamp typically operates differently when used with different types of ballasts. In some cases, a straightforward replacement of a florescent lamp by an LED lamp in a fluorescent luminaire results in a failure of the entire luminaire.

An LED lamp arrangement compatible with all three types of ballasts mentioned above (magnetic ballasts, constant current ballast, and constant power ballast) is described in the applicant's U.S. Pat. No. 9,832,837, herewith incorporated by reference in its entirety. This lamp arrangement comprises a plurality of LEDs arranged in a plurality of groups switchable between serial connection and parallel connection, depending on whether the ballast is a magnetic ballast or an electronic ballast, and further comprises an inductive element and a switch which can be closed to short the inductive element, depending on whether the electronic ballast is a constant power ballast or a constant current ballast.

Recently, there is an increasing demand for a universal LED lamp which can be fitted into fluorescent luminaires regardless of the type of ballast in the luminaire, and also luminaires without any ballast. Such a luminaire may for example be a luminaire which was originally designed for a fluorescent lamp but its ballast has been removed. This can happen for example when the ballast is too old and/or is damaged after years of operations. In such cases, many users want to get rid of the ballast but still want to keep the luminaire, or install a new luminaire without any ballast. Such a universal LED lamp can be installed in a luminaire without needing to determine whether there is a ballast in the luminaire or what type of the ballast is in the luminaire, enabling the manufacture and stocking of a single design of LED lamp suitable for use in any fluorescent luminaire.

SUMMARY OF THE INVENTION

It is therefore an object of the invention to provide an LED lamp which has good lighting performance when fitted in a variety of luminaires, regardless of whether the luminaire has a magnetic ballast, constant current ballast, constant power ballast, or has no ballast at all.

The invention relates to an LED lamp suitable for use in a luminaire (and in particular a luminaire designed for a fluorescent lamp), the LED lamp being adapted for receiving electrical power from the luminaire and comprising: one or more LEDs; a ballast protection circuit including an impedance; a filter circuit; a switched-mode power supply for driving the one or more LEDs; one or more sensing circuits for generating at least one output, in dependence on whether the electrical power received from the luminaire indicates that the electrical power is provided via a magnetic ballast, an electronic ballast which operates as a constant current ballast, an electronic ballast which operates as a constant power ballast, or not via a ballast (referred to herein as "direct mains"); and a plurality of switches for defining a plurality of operation modes of the LED lamp, and for switching among the plurality of operation modes in dependence on the at least one output from the sensing circuits.

The plurality of operation modes comprise: a first operation mode, in which the switched-mode power supply operates at an operation frequency, the filter circuit is connected for filtering noise generated by the switched-mode power supply, and the ballast protection circuit is disconnected; a second operation mode, in which the switched-mode power supply does not operate, the filter circuit is disconnected, the ballast protection circuit is connected, and the impedance is bypassed; and a third operation mode, in which the switched mode power supply does not operate, the filter circuit is disconnected, the ballast protection circuit is connected, and the impedance is connected in series with the LEDs.

The LED lamp may be adapted to switch to the first operation mode when the electrical power received from the luminaire indicates that the electrical power is provided via a magnetic ballast or not via a ballast. In this mode, power is provided to the LEDs via the switched-mode power supply.

The LED lamp may be adapted to switch to the second operation mode when the electrical power received from the luminaire indicates that the electrical power is provided via an electronic ballast which operates as a constant current ballast. In this mode, the ballast protection circuit is connected and the impedance in the ballast protection circuit is bypassed. The switched-mode power supply is not required and does not operate, and the filter circuit may be disconnected to avoid bypassing high frequency components of the current supplied from an electronic ballast and to avoid compatibility issues with some designs of electronic ballasts during the ballast ignition phase. The filter circuit may include a surge protection circuit or device, to protect against surges in the electrical power supplied to the LED lamp via a magnetic ballast or direct mains, and the surge protection circuit or device is preferably also disconnected in the second operation mode.

The LED lamp may be adapted to switch to the third operation mode when the electrical power received from the luminaire indicates that the electrical power is provided via an electronic ballast which operates as a constant power ballast. In this mode, the ballast protection circuit is connected and the impedance in the ballast protection circuit is connected in series with the LEDs. This provides an increased impedance in series with the LEDs, to reduce current through the LEDs The LED lamp may comprise a first power supply circuit for supplying power to the one or more LEDs via the ballast protection circuit, and a second power supply circuit for supplying power to the one or more LEDs via the filter circuit and the switched-mode power supply. The first power supply circuit provides power to the LEDs when the LED lamp is operating in the third operation mode, and the second power supply circuit provides power to the LEDs when the LED lamp is operating in the first or second operation modes.

The one or more sensing circuits may comprise a first sensing circuit for generating a first output signal for operating a first switch, where the first switch is arranged for connecting the first power supply circuit for supplying power via the ballast protection circuit to the one or more LEDs. The first sensing circuit may be arranged to sense a frequency of a voltage supplied by the luminaire, and may be arranged to connect the ballast protection circuit to the rectified voltage supplied to the LED lamp.

The switched-mode power supply may comprise a second sensing circuit for sensing a voltage or current supplied to the switched-mode power supply and operating the second switch in dependence on the sensed voltage or current. The second sensing circuit may be arranged to enable operation of the switched-mode power supply when a voltage or current received by the switched-mode power supply exceeds a predetermined threshold, and may enable operation of the switched-mode power supply when the LED lamp receives operating power from the luminaire and the first power supply circuit is not connected. The LED lamp may be configured such that connection of the first power supply circuit may cause the sensed voltage or current supplied to the switched-mode power supply to fall or stay below the predetermined threshold.

The one or more sensing circuits may comprise a third sensing circuit for generating a third output signal for operating a third switch, where the third switch is arranged for disconnecting the filter circuit when the first power supply circuit is enabled for supplying power to the one or more LEDs. The third sensing circuit may be arranged to sense an amplitude of a rectified voltage or current supplied to the LED lamp and generates the output signal, and the third switch may comprise an electromagnetic relay. The filter circuit may include a surge protection circuit or device, and the third switch may also disconnect the surge protection circuit or device.

The one or more sensing circuits may comprise a fourth sensing circuit for generating an output signal for operating a fourth switch, the fourth switch for bypassing the impedance. The fourth sensing circuit may be arranged to sense a voltage or current indicative of current flowing through the one or more LEDs, and the fourth switch may be arranged to switch the ballast protection circuit from a low impedance mode to a high impedance mode when the sensed voltage or current exceeds a predetermined threshold.

The LED Lamp may further comprise an auxiliary circuit, which defines a conductive path connected in parallel with the one or more LEDs, wherein the auxiliary circuit comprises a capacitor in the conductive path arranged to bypass a burst current from the LEDs, and further comprises a circuit for discharging the capacitor not through the LEDs.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a more detailed explanation of exemplary embodiments of the invention.

Figure 1:
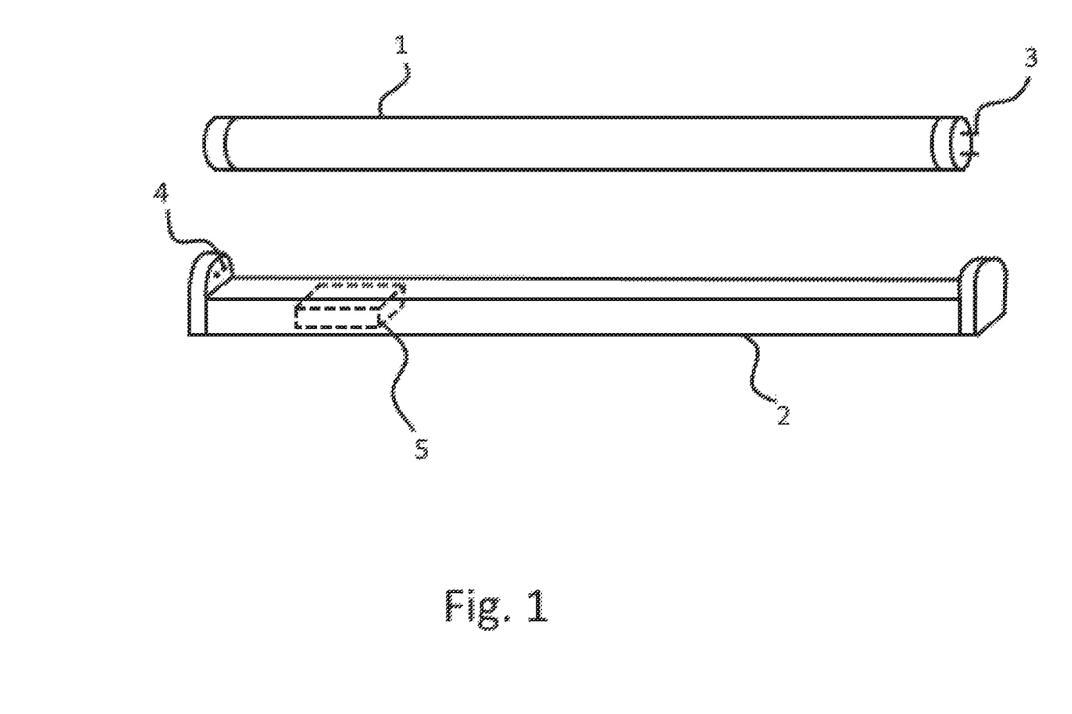
FIG. 1 is a diagram of an embodiment of the invention.

FIG. 1 is a diagram of an embodiment of the invention. The LED lamp 1 is configured to be compatible with a luminaire 2 designed for a fluorescent tube, the LED lamp preferably having the same length and shape as a standard fluorescent tube to enable the LED lamp 1 to fit into the luminaire without modification. Two electrical connectors 3 (usually in the form of pins) are provided at each end of the LED lamp 1, for releasably connecting to corresponding connectors 4 of the luminaire. The luminaire 2 may include a ballast 5 or may have no ballast. The ballast 5, if included in the luminaire, may be a magnetic ballast, an electronic ballast which operates as a constant current ballast, or an electronic ballast which operates as a constant power ballast.

The luminaire 2 provides electrical power to the LED lamp 1 via the connectors 4. The electrical power provided by the luminaire 2 which is input to the LED lamp 1 will vary depending on the design of the luminaire, i.e. whether the luminaire has a ballast and if so, what type of ballast.

A luminaire without a ballast typically provides AC mains voltage at the connectors 4, e.g. 120 Vac or 230 Vac at 50 Hz or 60 Hz. This is referred to as "direct mains", although the luminaire may include some electrical circuit components between the AC main input and the luminaire's connectors 4.

A magnetic ballast regulates the electrical current supplied by the luminaire using an inductive element, typically providing electrical power at the connectors 4 at mains frequency and voltage similar to the direct mains case.

An electronic ballast typically converts AC mains voltage power to DC and then back to a variable frequency AC voltage, providing a high frequency electrical power at the connectors 4, e.g. 100-110 Vac at 20 kHz to 200 kHz. Electronic ballasts are generally designed as constant current ballasts which are designed to supply electrical current at a substantially constant amplitude, or constant power ballasts designed to deliver substantially constant power and whose output current will vary depending on the load impedance to attempt to maintain the design power output. If the load voltage (e.g. across the LED lamp 1) is below the expected fluorescent lamp voltage, constant power ballasts usually try to increase the output current to come closer to the design power level.

Figure 2:
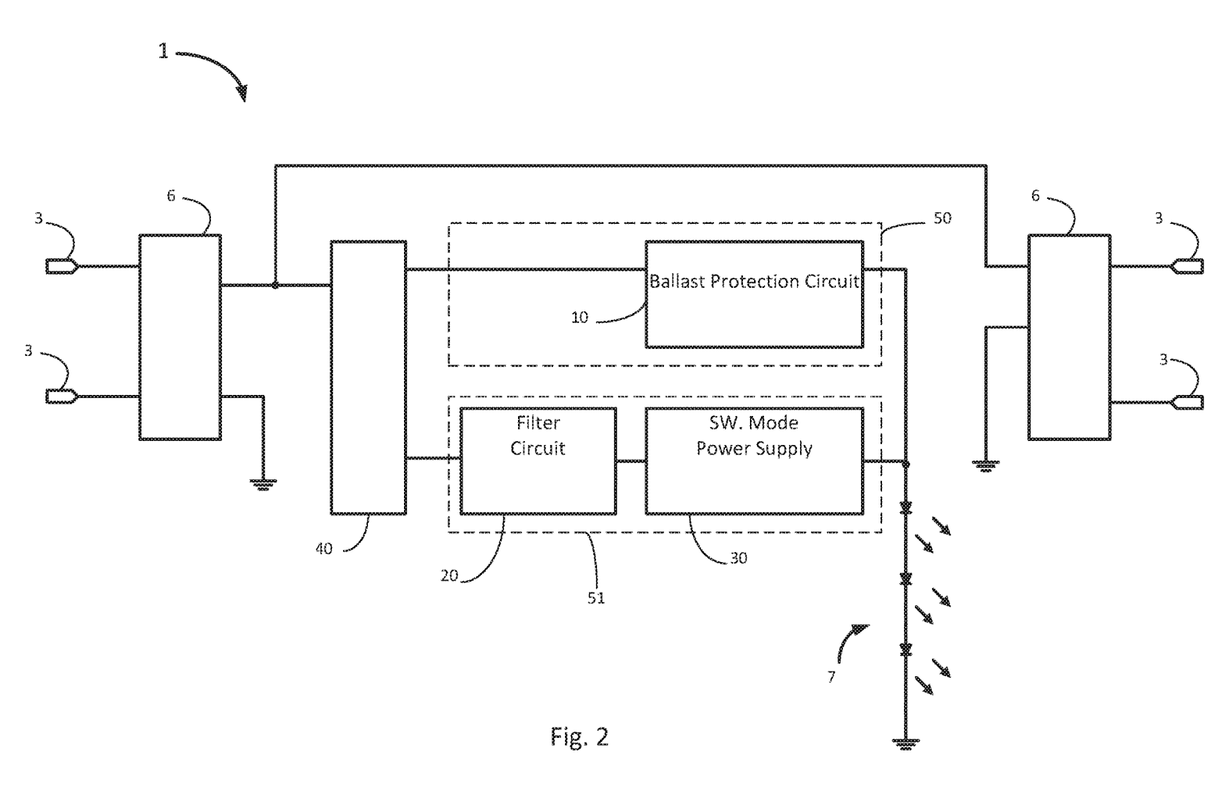
FIG. 2 is a schematic diagram of the LED lamp 1 of FIG. 1.

FIG. 2 is a schematic diagram of the LED lamp 1 of FIG. 1. A rectifier 6 (preferably a full-wave rectifier) at each end of the LED lamp 1 connects to connection pins 3 and functions to rectify an AC voltage applied to the connection pins 3 (i.e. supplied by the connectors 4 of luminaire 2) to generate a DC voltage for powering the LED lamp 1.

The LED lamp 1 includes one or more LEDs 7 for generating light. Although three LEDs are shown in the drawings, any number of LEDs may be used as appropriate considering the specification of LEDs used, the amount of light to be generated, and the overall design of the LED lamp. The LEDs 7 may be connected in series or parallel, or multiple series strings of LEDs connected in parallel, or any other combination of connections as desired.

The LED lamp 1 includes a ballast protection circuit 10 for supplying power to the LEDs 7 when the LED lamp 1 detects it is receiving power from a luminaire with an electronic ballast, and includes a filter circuit 20 and switched-mode power supply 30, for supplying power to the LEDs 7 when the LED lamp 1 detects it is receiving power from a luminaire without a ballast or with a magnetic ballast. A switching circuit 40 is also included for sensing the received power and switching the various circuits in dependence on the characteristics of the received power. The switching circuit 40 may be implemented as a centralized circuit for generating multiple switching signals, or as several separate circuits each generating a switching signal where the multiple signals together perform the function of the switching circuit 40. The switching circuit 40 may be implemented as one or more simple circuits formed by discrete circuit elements, or may be implemented as one or more integrated circuits or microcontrollers or the like. An integrated circuit or microcontroller can additionally be used to ensure the switching signals do not switch the circuits of LED lamp 1 into an unsafe or undesired configuration.

In this embodiment, LED lamp 1 comprises two parallel power supply circuits for powering the LEDs 7. First power supply circuit 50 supplies power via ballast protection circuit 10, for operation in a luminaire with an electronic ballast. Second power supply circuit 51 supplies power via filter circuit 20 and switched-mode power supply 30, for operation in a luminaire without a ballast or with a magnetic ballast.

When LED lamp 1 is installed in a luminaire with no ballast, the connectors 3 typically receive AC mains voltage, and the output from the rectifiers 6 (preferably full-wave rectifiers) is a pulsating DC voltage with maximum voltage typically close to 170 Vpk and 325 Vpk for 120 Vac and 230 Vac applications respectively, and a ripple frequency of twice the mains frequency, e.g. 100 Hz or 120 Hz (for full-wave rectification).

When LED lamp 1 is installed in a luminaire with a magnetic ballast, the connectors 3 typically receive AC mains voltage modified by the inductive element in the ballast, and during steady-state operation the output from rectifiers 6 (preferably full-wave rectifiers) is a pulsating DC voltage similar to the situation with no ballast.

When LED lamp 1 is installed in a luminaire with an electronic ballast, the connectors 3 receive a high frequency AC voltage generated by the electronic ballast. When the electronic ballast is started, it first generates a high output voltage typically around 400 Vac designed to ignite a fluorescent lamp. After the ignition period the output voltage drops and is dependent on the load impedance, typically having a voltage lower than AC mains voltage, e.g. in the range from 40-80 Vac depending on the load, and having a frequency much higher than AC mains voltage, e.g. in the range from 20 kHz to 200 kHz. Accordingly, the output from rectifiers 6 is a high frequency pulsating DC voltage with low maximum voltage (after the ignition period) typically in the range 40-80 Vac (depending on the load) and with a high frequency ripple of typically 40 kHz to 400 kHz.

The switching circuit 40 detects the type of ballast (if any) supplying power to LED lamp 1 and switches LED lamp 1 between different operating modes in dependence on the detection. In one embodiment switching circuit 40 is designed to distinguish between, on the one hand direct mains power or power supplied from a magnetic ballast, and on the other hand power supplied from an electronic ballast.

In one embodiment, switching circuit 40 senses the voltage supplied to LED lamp 1 to distinguish an electronic ballast from a magnetic ballast or direct mains. For a magnetic ballast or direct mains the voltage supplied to LED lamp 1 is substantially the mains voltage, e.g. 120 or 230 Vac. This is significantly higher than the typical output voltage of an electronic ballast, which is typically in the range 40-80 Vac depending on number of LEDs 7 in series. This permits a simple, compact and low cost circuit to be used to implement in switching circuit 40, to detect when the supply voltage is above or below a threshold (e.g. 100 Vac) to distinguish the type of ballast in use.

In another embodiment, switching circuit 40 senses the frequency of the voltage or current supplied to LED lamp 1 to distinguish an electronic ballast from a magnetic ballast or direct mains. For a magnetic ballast or direct mains the frequency of the AC voltage and current supplied to LED lamp 1 is substantially the mains frequency, e.g. 50 or 60 Hz. This is much lower than the typical output frequency of an electronic ballast, which is typically in the range of 20 to 200 kHz. Thus, switching circuit 40 may be designed to detect when the supply frequency is above or below a threshold to distinguish the type of ballast in use.

The sensing of the supply voltage or frequency may be made on the AC side of the rectifier, measuring the amplitude or frequency of the AC voltage received from the luminaire, or may be made on the DC side of the rectifier, measuring the amplitude or ripple frequency of the rectified DC voltage supplied to the LED lamp 1.

When switching circuit 40 detects that LED lamp 1 is receiving power supplied from an electronic ballast, then switching circuit 40 connects first power supply circuit 50 to supply power to LEDs 7 via ballast protection circuit 10, and disconnects second power supply circuit 51. In this operating mode, ballast protection circuit 10 is in operation, and filter circuit 20 is preferably disconnected and switched-mode power supply 30 is preferably disabled or put into a non-operating mode.

Note that the terms "switch", and "connect", "close" or "turn on", and "disconnect", "open" or "turn off", encompass digital on/off switching such as produced by an electromechanical relay, but also analog switching involving variation in impedance such a produced by a transistor or MOSFET or the like, i.e. variation between an on or connected state with relatively low impedance, to an off or disconnected state with relatively high impedance. In this way the switching circuit 40 determines the path of current to power the LEDs 7.

When switching circuit 40 detects that LED lamp 1 is receiving power supplied from a magnetic ballast or direct mains, then switching circuit 40 connects second power supply circuit 51 to supply power to LEDs 7 via filter circuit 20 and switched-mode power supply 30, and disconnects first power supply circuit 50. In this operating mode, ballast protection circuit 10 is disconnected, while filter circuit 20 is connected and switched-mode power supply 30 is enabled.

Switched-mode power supply 30 may be of conventional design for converting the rectified DC supply from rectifiers 6 to generate a switched DC output suitable for driving LEDs 7. Filter circuit 20 provides filtering of the electromagnetic interference (EMI) generated by switched-mode power supply 30.

Filter circuit 20 may also preferably include a surge protection circuit or device, to protect against surges in the AC mains supply when second power supply circuit 51 is connected for operation with a magnetic ballast or direct mains. A metal oxide varistor (MOV) or similar circuit element may be used as a surge protection device, typically with a clamping voltage in the range of 275V to 400V. This surge protection is not necessary when first power supply circuit 50 is connected for operation with an electronic ballast, because electronic ballasts usually provide surge protection internally. Furthermore, electronic ballasts typically include an ignition mechanism which generates a high ignition voltage when turned on, as a design feature to quickly start a fluorescent tube. Repeated exposure to this initial high voltage every time LED lamp 1 is turned on when installed in a luminaire fitted with an electronic ballast, will likely cause premature failure of the surge protection device. Thus, when switching circuit 40 detects that LED lamp 1 is receiving power supplied from an electronic ballast, switching circuit 40 disconnects filter circuit 20 and disconnects the surge protection circuit or device as well.

The switching circuit 40 thus switches LED lamp 1 between different operating modes in dependence on whether LED lamp 1 is receiving power from a magnetic ballast or direct mains on the one hand, or from an electronic ballast on the other hand. If LED lamp 1 is receiving electrical power supplied from an electronic ballast, the first power supply circuit 50 is connected to supply power to LEDs 7. Ballast protection circuit 10 then operates, and may switch LED lamp 1 between further operating modes in dependence on whether LED lamp 1 is receiving power from an electronic ballast which operates as a constant power ballast or from an electronic ballast which operates as a constant current ballast.

Figure 3:
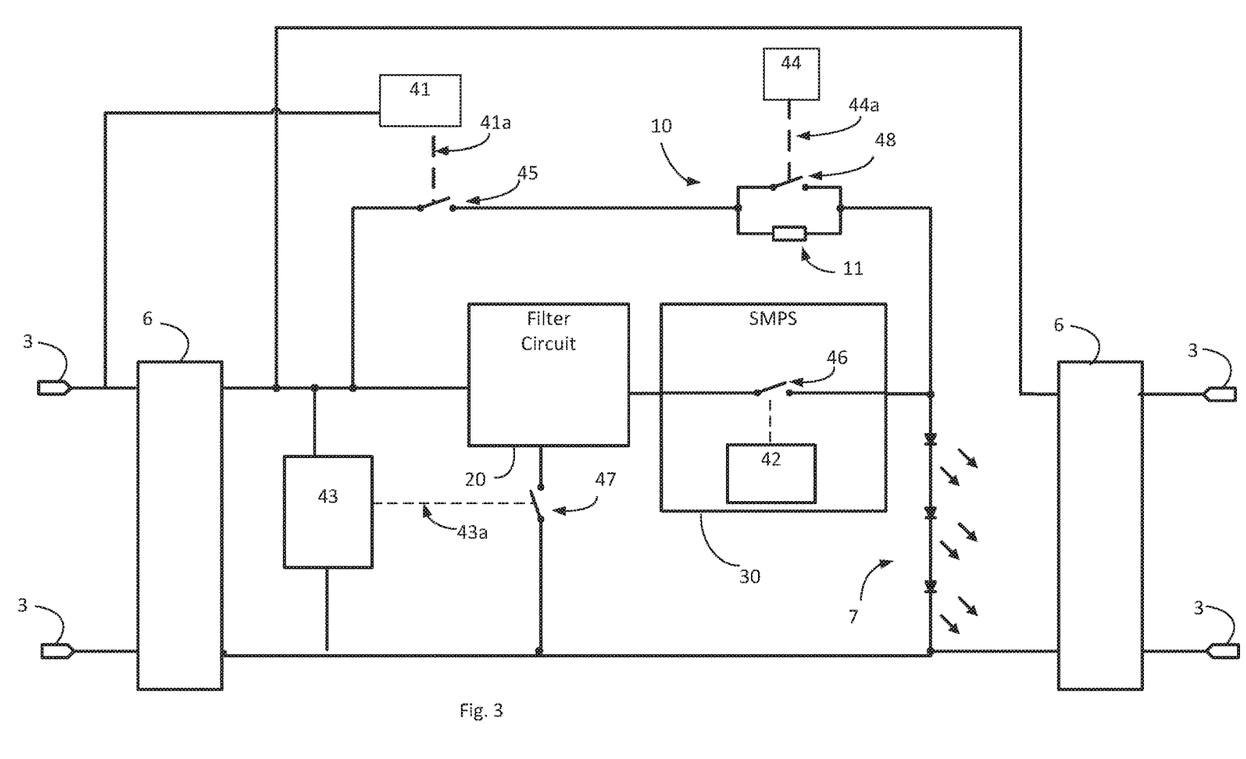
FIG. 3 is a more detailed schematic diagram of the LED lamp 1 of FIG. 2.

FIG. 3 is a more detailed schematic diagram of the LED lamp 1 of FIG. 2, showing details of one embodiment of the switching circuit 40, and of one embodiment of the ballast protection circuit 10, each of which may be used in the LED lamp 1.

Switching Circuit 40

In this embodiment, switching circuit 40 comprises four sensing circuits 41-44 which are implemented as separate circuits. A first sensing circuit 41 generates an output 41a for operating first switch 45 for connecting and disconnecting the first power supply circuit 50 to supply current to LEDs 7 via ballast protection circuit 10. A second sensing circuit 42, which is implemented in the internal circuitry of switched-mode power supply 30 in this embodiment, generates an output for enabling or disabling the switched-mode power supply 30, for example by enabling or disabling operating switch 46 of switched-mode power supply 30. A third sensing circuit 43 generates an output 43a for operating third switch 47 for connecting or disconnecting one or more components in the filter circuit 20. A fourth sensing circuit 44 generates an output 44a for operating switch 48 for ballast protection circuit 10.

Switches 45-48 may be any type of suitable switch, for example, an electromechanical switch such as a relay, or a semiconductor switch such as a transistor, MOSFET or the like. Note that the terms "open" and "close" should also be understood to mean "turn off" and "turn on" or "disable" and "enable" respectively when referring to any of the switches described in this specification.

First sensing circuit 41 provides an output for controlling operation of first switch 45. When first switch 45 is closed, first power supply circuit 50 is connected to supply power to LEDs 7, when it is detected that the LED lamp 1 is receiving power from an electronic ballast. First switch 45 connects the LEDs 7 directly to the DC power supply, i.e. to DC power supply line 9, via the ballast protection circuit 10. When first switch 45 is open, first power supply circuit 50 is disconnected. In one embodiment, first switch 45 is normally in the closed position, and when first sensing circuit 41 detects that LED lamp 1 is receiving power via a magnetic ballast or direct mains, its output causes first switch 45 to open, so that first power supply circuit 50 is disconnected. In another embodiment, first switch 45 is normally in the open position, and when first sensing circuit 41 detects that LED lamp 1 is receiving power via an electronic ballast, its output causes first switch 45 to close, so that first power supply circuit 50 is connected to the LEDs 7 via ballast protection circuit 10. In this embodiment, first sensing circuit 41 senses on the AC side of the rectifier, measuring the frequency of the AC voltage received from the luminaire 2. Since the frequency varies greatly between the relatively low frequency for direct mains or a magnetic ballast, and relatively high frequency for an electronic ballast, the first sensing circuit 41 can readily distinguish between these situations. Although sensing voltage is also possible, this is more difficult since the voltage to be measured is floating. Sensing on the DC side is also possible, but requires a more complex circuit.

In this embodiment, second switch 46 is part of switched-mode power supply 30, i.e. it is the switch in the power supply which generates the switched output to drive the LEDs 7. In this embodiment, switched-mode power supply 30 includes second sensing circuit 42 to enable or disable operation of switched-mode power supply 30 by sensing the amplitude or frequency of the electrical power received by switched-mode power supply 30. In one embodiment, second sensing circuit 42 detects the voltage at the input of switched-mode power supply 30 and/or current flowing through the switched-mode power supply 30, and generates an output to initiate operation of switched-mode power supply 30 when the voltage across the switched-mode power supply 30 or current through the switched-mode power supply 30 exceeds a certain threshold. For example, operation of switched-mode power supply 30 may be initiated when its input voltage is in the range of 40-60V.

When first switch 45 is closed to connect the first power supply circuit 50 while power is supplied to LED lamp 1, the voltage across and current through switched-mode power supply 30 drops, and sensing circuit 42 generates an output which disables operation of switched-mode power supply 30 and switch 46 is put in the open state. When first switch 45 is open while power is supplied to LED lamp 1, the voltage across and current through switched-mode power supply 30 rises, and sensing circuit 42 generates an output which enables operation of switched-mode power supply 30.

When switched-mode power supply 30 is enabled, second switch 46 switches at high frequency (typically around 50 kHz) to generate an output to drive LEDs 7. When switched-mode power supply 30 is disabled, second switch 46 is set to the open position, so that switched-mode power supply 30 does not supply power to the LEDs 7 (i.e. the connection of DC power line 9 to LEDs 7 via switched-mode power supply 30 is disconnected). In another embodiment, switched-mode power supply 30 receives a signal from switching circuit 40 to enable or disable operation of the switched-mode power supply 30. In another embodiment, an additional switch it provided separate from switched-mode power supply 30 to connect or disconnect second power supply circuit 51 (and switched-mode power supply 30).

Third sensing circuit 43 provides an output for controlling operation of third switch 47. When third switch 47 is closed, filter circuit 20 is connected and functions to filter EMI generated by switched mode power supply 30, and when third switch 47 is open, at least some of the components of filter circuit 20 are disconnected or bypassed. In one embodiment, third switch 47 connects filter circuit 20 across the DC power supply (i.e. between DC power line 9 and ground (0V) at the output of rectifiers 6) to enable the filter circuit 20 to filter out EMI generated by switched-mode power supply 30. When the first power supply circuit 50 is in use (i.e. when LED lamp 1 receives power from an electronic ballast) and second power supply circuit 51 is not used, third switch 47 disconnects filter circuit 20. This is done because the front-end capacitor in the filter circuit (connected across the DC power supply, between DC power line 9 and ground) may prevent the proper operation of ballast protection circuit 10 by bypassing (at least some of) the high frequency component of the current supplied from the electronic ballast to ground, which may also cause a loss of system efficiency by diverting current away from the LEDs 7. This capacitor may also cause compatibility issues with some designs of electronic ballasts during the ballast ignition phase. Some electronic ballasts sense whether a lamp is present at its output before starting the ignition phase, by passing a very small current through the filaments of the lamp and sensing the return current to confirm there is a lamp fitted in the luminaire. The front-end capacitor of filter circuit 20 will be charged by this small current, and the ballast will not detect a return current and may shut down. This would result in poor compatibility when LED lamp 1 is used with such ballasts. Switch 47 solves these problems.

In this embodiment, third sensing circuit 43 senses on the DC side of the rectifier, measuring the amplitude of the rectified DC voltage supplied to the LED lamp 1. Since the operating voltage varies greatly between the relatively high peak voltage for direct mains or a magnetic ballast and relatively low voltage for an electronic ballast, referenced to ground (0V), a simple circuit can be used to distinguish between these situations. This design enables a simple and cost effective circuit to be used. Sensing of frequency and/or sensing on the AC side of the rectifiers is also possible, but leads to a more complex circuit.

In one embodiment, third switch 47 is normally in the open position with the filter circuit 10 disconnected, and when third sensing circuit 43 detects that LED lamp 1 is receiving power via a magnetic ballast or direct mains, its output causes third switch 47 to close, so that the filter circuit 20 is connected. In another embodiment, third switch 47 is normally in the closed position, and when third sensing circuit 43 detects that LED lamp 1 is receiving power via an electronic ballast, its output causes third switch 47 to open, so that filter circuit 20 is disconnected. Third switch 47 is preferably an electromagnetic relay rather than a semiconductor switch such as a transistor or MOSFET. A relay typically has a very low impedance when closed, whereas a semiconductor switch has a relatively higher impedance even when turned on, e.g. a few hundred milliohms. This higher "on" impedance of a semiconductor switch leads to higher EMI emissions from the circuit, which is avoided by use of the relay switch.

In one embodiment, the closing of first switch 45 is delayed for a short time, e.g. by a few hundred milliseconds, to simulate the ignition behavior of a fluorescent lamp. When LED lamp 1 is turned on and detects that an electronic ballast is supplying power to the LED lamp, switching circuit 40 will operate to connect first power supply circuit 50 to supply power to the LEDs 7. However, imposing a short delay between turning on the electronic ballast and the closing of first switch 45 creates a short period when the impedance of LED lamp 1 as seen by the ballast is high. This short delay may be implemented in first sensing circuit 41 to impose a predetermined delay before closing first switch 45. This simulates the start-up behaviour of a fluorescent lamp which has a high impedance before the fluorescent tube ignites. This feature avoids problems when operating LED lamp 1 with electronic ballasts which are designed to expect a high load impedance at startup and may shutdown or behave erratically if the load impedance is too low. Thus, this feature improves the compatibility of LED lamp 1 with electronic ballasts.

Ballast Protection Circuit 10

When the LED lamp 1 detects that the electrical power supplied by the luminaire is supplied from an electronic ballast, the filter circuit 20 and switched-mode power supply 30 are bypassed, and power is supplied to LEDs 7 via ballast protection circuit 10. Ballast protection circuit 10 operates as a variable impedance arranged in series with LEDs 7. When current drawn by LED lamp 1 or voltage across the LED lamp 1 is within the expected range, the impedance of ballast protection circuit 10 is low, but when the current or voltage exceeds a threshold, the impedance of ballast protection circuit 10 is increased to increase the impedance of LED lamp 1 across the output of the luminaire 2 and ballast 5 supplying power to the LED lamp. This increased impedance reduces problems when operating the LED lamp with certain types of electronic ballasts which operate as constant power ballasts, e.g. reducing system power of such ballasts by around 15% by adding impedance in the circuit.

The ballast protection circuit 10 can switch between at least two impedance values, so as to conduct current at least in a low impedance mode and in a high impedance mode and optionally further modes, e.g. in two or more discrete operation modes. Alternatively, the ballast protection circuit 10 may comprise a variable impedance that can continuously change an effective impedance to conduct current at different impedance values.

Ballast protection circuit 10 is connected in series with LEDs 7, so that variation in the impedance of ballast protection circuit 10 will vary the total impedance of the LED lamp 1 appearing across the output of the luminaire 2 and ballast 5. Ballast protection circuit 10 varies its impedance in dependence on the current drawn by the LED lamp 1 and/or the voltage across the LED lamp 1. In this embodiment, when current drawn from ballast 5 and/or the voltage supplied by ballast 5 exceeds a predetermined threshold, the ballast protection circuit 10 is arranged to automatically switch from a low impedance mode to a high impedance mode so that the current flowing through ballast protection circuit 10 and LEDs 7, and thus the current drawn from luminaire 2 is reduced, and thermal runaway and other detrimental effects on ballast 5 can be avoided and the lifetime of ballast 5 can be increased.

In this way, LED lamp 1 which draws a low power can be safely fitted in a luminaire 2 designed for a higher power fluorescent lamp (e.g. a 28 W LED lamp replacing a 58 W fluorescent tube), even when luminaire 2 is equipped with a constant power ballast. The LED load impedance of LED lamp 1 is much lower than the load impedance of a fluorescent lamp. The constant power ballast will try to maintain its design output power (e.g. 58 W). The output voltage across the ballast load (LED lamp 1) will be lower, and the ballast will react by driving higher output current to maintain a constant output power level. Ballast protection circuit 10 is designed to react to the higher ballast output current or voltage and automatically increase its impedance. Current flowing from the ballast flows through ballast protection circuit 10 and LEDs 7, and a change of impedance of protection circuit 10 will affect the total impedance across the output of the ballast. The increase in the total impedance of LED lamp 1 increases the voltage across the ballast output, and reduces ballast output current to avoid damage to the ballast.

The ballast protection circuit 10 is arranged to measure or react to a current and/or a voltage, wherein a change of the measured value(s) represents a change of the total current drawn from the ballast and/or the voltage across the LED lamp 1. The ballast protection circuit 10 may include a sensor, e.g. a voltage or current sensor, or may use an electrical element which has different characteristics at different current/voltage values, or an electrical element that reacts or "trips" when a certain current or voltage threshold is reached.

In the embodiment of FIG. 3 the ballast protection circuit 10 comprises an impedance 11 and fourth switch 48 arranged in parallel, which together form a variable impedance. The impedance 11 may be an inductive element, resistive element, active element, or any combination of these. Impedance 11 is preferably an inductive impedance having an inductance between 0.12 and 0.3 mH, and preferably 0.18 mH. The fourth switch 48 may be a fuse or circuit breaker element, which combines a circuit breaking function with a current sensing function, sensing the current flowing through fourth switch 48, i.e. the fuse blows or the circuit breaker trips when the current flowing through the fuse or circuit breaker exceeds a predetermined threshold.

Alternatively, fourth switch 48 may be any suitable type of switch, for example, an electromechanical relay or a semiconductor switch such as a transistor or MOSFET, which is operated (opened/turned off and closed/turned on) by a separate fourth sensing circuit 44.

The separate fourth sensing circuit 44 may measure a current representing current drawn by the LED lamp 1 from the luminaire and/or a voltage representing a voltage supplied to the LED lamp 1 from the luminaire. In one embodiment, the fourth sensing circuit 44 includes active sensing components, e.g. provided with one or more operational amplifiers, and/or one or more transistors, and/or one or more MOSFETs, and/or a microcontroller or microprocessor to monitor the current extracted from the ballast and/or the voltage supplied by the ballast. Fourth switch 48 can be designed for one-time use (such as a fuse) or may be resettable (such as a circuit breaker). A temperature-operated switch (e.g. a thermo-switch) may also be used.

The ballast protection circuit 10 may be arranged to switch from a low impedance mode to a higher impedance mode by opening fourth switch 48. In the embodiment shown, in the low impedance mode, fourth switch 48 is closed and impedance 11 is short-circuited (bypassed) by the switch. The impedance of fourth switch 48 is preferably low, so that in the low impedance mode, ballast protection circuit 10 has a negligible effect on the operation of ballast 5 and LED lamp 1. In the higher impedance mode (as shown), fourth switch 48 is open, so that substantially all of the current drawn from the ballast 5 flows through impedance 11. Impedance 11 has an impedance sufficiently large to increase the overall impedance across LED lamp 1 and across the output of ballast 5, preferably increasing the impedance by at least 20-30 times. As an example, the load impedance of LEDs 7 is typically a few tens of ohms, and the ballast protection circuit 10 adds around 100 ohms in the high impedance mode.

In a preferred embodiment, the low impedance mode is primarily resistive and is preferably the default operation mode, and ballast protection circuit 10 is arranged to switch from the low impedance mode to a higher impedance mode only if an increase in measured current and/or voltage exceeds a threshold value. This ensures that LED lamp 1 operates in the low impedance mode, e.g. when ballast 5 is a constant current ballast. Constant current ballasts typically have a self-protection/self-correcting mechanism to avoid potential problems of maintaining a constant current. If the impedance of LED lamp 1 deviates from the usual fluorescent tube impedance too much (e.g. having a large or complex impedance such as inductive or capacitive), there is a risk that the ballast will automatically shut down or enter a safety mode. By designing LED lamp 1 to operate in the low impedance mode by default, the risk of this happening can be reduced.

In one embodiment, the fourth switch 48 or fourth sensing circuit 44 is arranged to determine whether a current flowing through the fourth switch 48 and/or a voltage across the fourth switch 48 exceeds a predetermined threshold value.

For example, when the current and/or voltage is below the threshold value, e.g. when a constant current ballast is connected to LED lamp 1, fourth switch 48 remains closed so that the effective impedance of ballast protection circuit 10 has an order of magnitude determined by the impedance of fourth switch 48 (low impedance mode). When the current/voltage exceeds the threshold value (e.g. when the ballast is a constant power ballast, which may generate for example twice the current from the ballast relative to a constant current ballast), the fourth switch 48 is opened, so that the effective impedance of ballast protection circuit 10 has an order of magnitude determined by impedance 11. As a result, ballast protection circuit 10 switches from the low impedance mode to a higher impedance mode, reducing the current drawn from the ballast to avoid thermal runaway.

Figure 4:
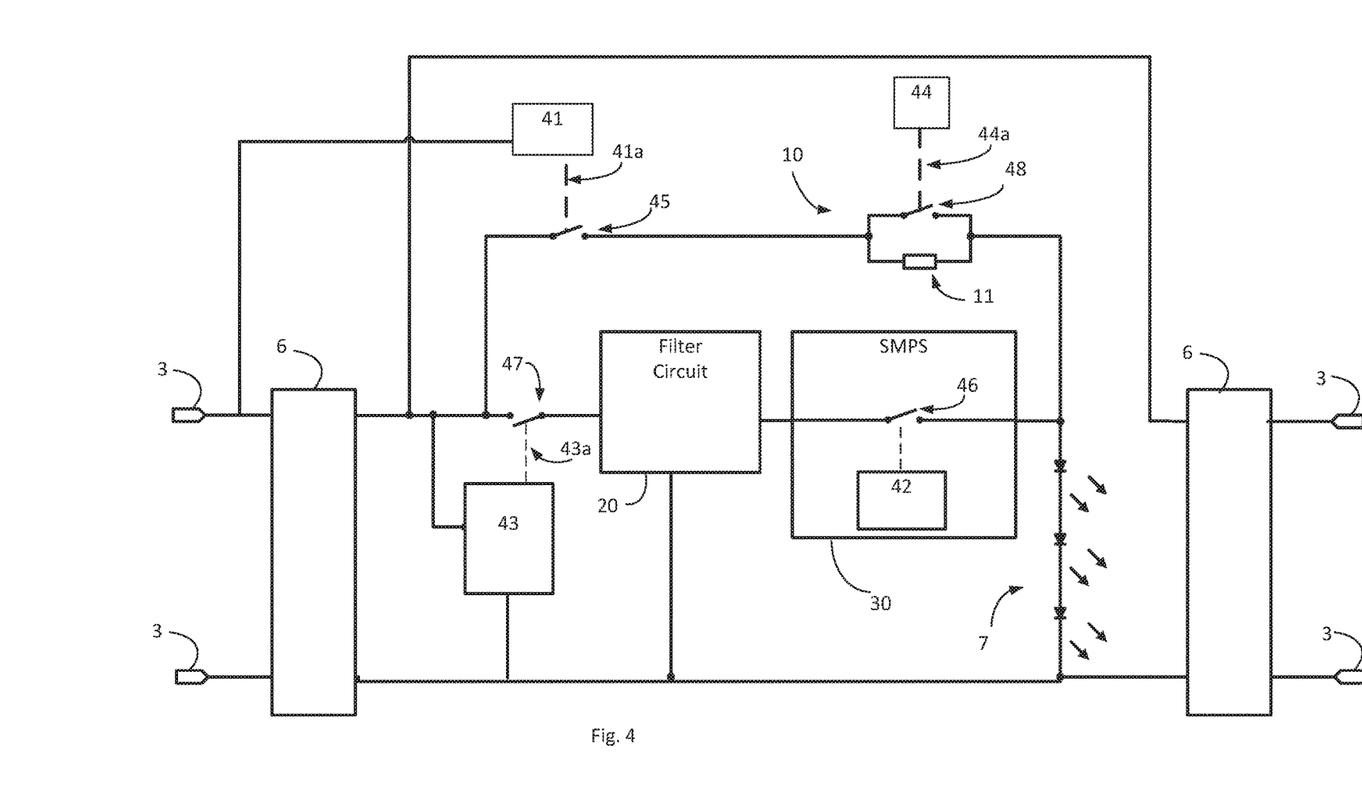
FIG. 4 is an alternative embodiment of the LED lamp 1 of FIG. 3.

FIG. 4 is an alternative embodiment of the LED lamp 1 of FIG. 3. In this embodiment, the third switch 47 is arranged in series with the filter circuit 20. When third sensing circuit 43 detects that LED lamp 1 is receiving power from direct mains or a magnetic ballast, the third sensing circuit 43 provides an output to close third switch 47 to connect the second power supply circuit 51, i.e. filter circuit 20 and switched-mode power supply 30. Many types of electronic ballast are designed to carry out internal diagnostic checks when they are turned on. When the LED lamp 1 receives power from an electronic ballast, it is preferable that LED lamp 1 presents a high impedance load to the electronic ballast for a period long enough for the ballast to perform these internal diagnostic checks (i.e. similar to the initial high impedance of a fluorescent tube). As a consequence, in the embodiment depicted in FIG. 4 the sensing circuit 43 preferably has an impedance, upon switch on of the mains power supply (with or without a ballast), of at least 2 MOhm for a time period of at least 75 msec.

Figure 5:
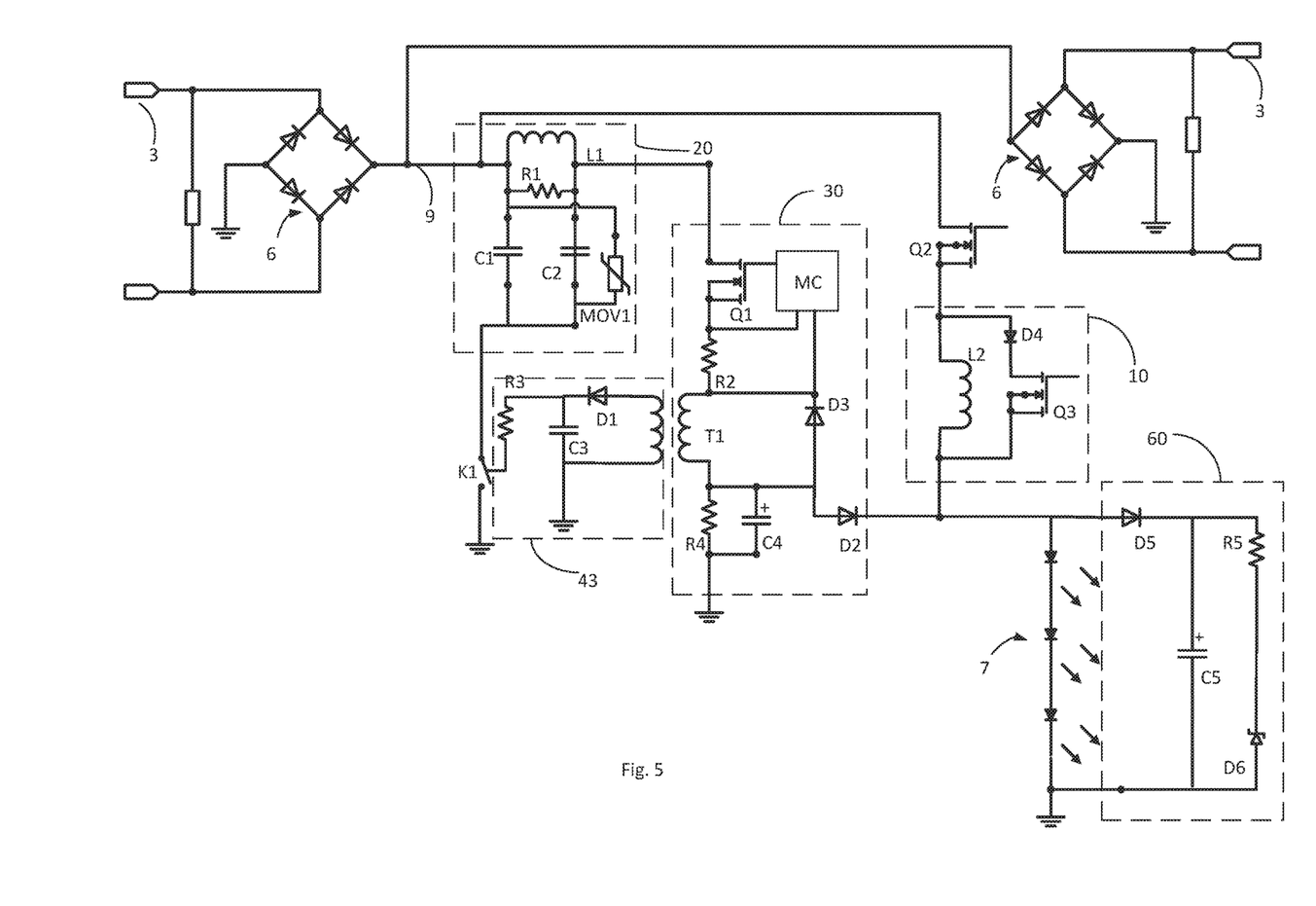
FIG. 5 is a simplified circuit diagram which may be used as an embodiment of the LED lamp 1.

FIG. 5 is a simplified circuit diagram which may be used as an embodiment of the LED lamp 1 of FIG. 2 and FIG. 3.

Filter circuit 20 comprises an inductor L1 in series with the switched-mode power supply 30, resistor R1 in parallel with the inductor, capacitor C1 between the DC power line 9 and ground, and capacitor C2 between the output of filter circuit 20 and ground, both capacitors connected to ground via electromagnetic relay K1 (serving as third switch 47). Filter circuit 20 also includes a metal oxide varistor MOV1 providing surge protection, connected between the DC power line 9 and ground via relay K1. Thus, when relay K1 is open (i.e. switch 47 opened), capacitors C1 and C2 and surge protector MOV1 are all disconnected to avoid problems when operating the LED lamp 1 with an electronic ballast.

Relay K1 is controlled by a signal generated by third sensing circuit 43. In this embodiment, third sensing circuit 43 functions as a current sensing circuit to turn relay K1 on or off in dependence on the output current of switched-mode power supply 30, measured through transformer T1. This acts as a discriminator between direct mains or magnetic ballast, and electronic ballast operating modes.

Switched-mode power supply 30 comprises transistor Q1 (serving as second switch 46) which performs the switching function of the power supply to generate the desired output for driving the LEDs 7. Transistor Q1 is connected to drive LEDs 7 via resistor R2, transformer T1, and diode D2 connected in series. Smoothing of the switched output from the switched-mode power supply 30 is provided by the inductance of transformer T1 and capacitor C4. Diode D3 functions as a freewheeling and diode D2 functions to electrically disconnect switched-mode power supply 30 from ballast protection circuit 10 and transistor Q2 (first switch 45). This allows the load impedance of LED lamp 1 to be resistive and provides good compatibility with different types of ballasts. With an electronic ballast, resistor R4 is used to discharge capacitor C4 after the LED lamp 1 is turned off. Transistor Q1 is controlled by a microcontroller to provide the required switching function to generate the desired output for driving the LEDs 7. The microcontroller also includes a sensing circuit for sensing of the voltage across resistor R2 to enable and disable operation of the switched-mode power supply. A signal from a separate sensing circuit may be used as an input to the microcontroller to enable or disable the switched-mode power supply, e.g. putting transistor Q1 in the turned-off state.

Transistor Q2 (serving as first switch 45) is connected in series with ballast protection circuit 10. When transistor Q2 is turned off, power supply to the LEDs 7 via ballast protection circuit 10 is disconnected, and when transistor Q2 is turned on power supply to the LEDs 7 via ballast protection circuit 10 is connected. Transistor Q2 may be controlled by first sensing circuit 41 described above, or another sensing circuit performing the sensing function.

Ballast protection circuit 10 comprises series-connected diode D4 and transistor Q3 (serving as fourth switch 48) which are connected in parallel with inductor L2. When transistor Q3 is turned off, the impedance of inductor L2 appears in series with LEDs 7, so that the impedance across the LED lamp 1 (i.e. between DC power line 9 and ground) includes the impedance of inductor L2 added to impedance of LEDs 7. When transistor Q3 is turned on, inductor L2 is shorted by diode D4 in series with transistor Q3. Since the forward impedance of diode D4 and the impedance across transistor Q3 in the on state are both much smaller than the impedance of inductor L2, the impedance across the LED lamp 1 (i.e. between DC power line 9 and ground) is reduced by effectively removing the impedance of inductor L2. Transistor Q3 may be controlled by fourth sensing circuit 44 described above, or another sensing circuit performing the sensing function.

In some designs of electronic ballasts, the ballast continues to output power for a short period after the lamp has been switched off, particularly in the form of voltage spikes, pulses, or bursts of voltage spikes or pulses (simply called bursts in the following). These busts do not cause a problem when the ballast is driving a fluorescent lamp, but may cause an LED lamp to produce flashes of light when the lamp is switched off by the user, which is undesirable. The embodiment of FIG. 5 includes an additional circuit to reduce or avoid these light flashes when the LED lamp 1 is used with this type of electronic ballast.

In this embodiment, an auxiliary circuit 60 provides a conductive path connected in parallel with the LEDs 7, so that current generated by the bursts is conducted via the conductive path to bypass the LEDs 7. In order to bypass the burst current, the conductive path should have a lower impedance than the LEDs. In this embodiment, the conductive path comprises capacitor C5. A capacitance is preferred to provide a low impedance at the high burst frequency. The capacitance of the capacitor C5 is preferably high enough to absorb the burst current, e.g. to avoid quickly approaching a maximum charged state when a burst is received, and low enough so that the capacitor is sufficiently discharged during the time intervals between bursts, so that the capacitor can absorb the current from the next burst.

Preferably, the capacitor C5 has a capacitance in a range of 10 μF-50 μF. When a burst voltage occurs, in particular during peaks of each burst, capacitor C5 conducts current and bypasses the LEDs 7. In this way, only a small portion or none of the burst current flows through LEDs 7, so that the LEDs produce very little or no light. As a result, the light flashes caused by the bursts can be avoided or reduced.

In the embodiment shown, the auxiliary circuit 60 is arranged to discharge capacitor C5 during the time interval between bursts, typically in a range from 1 millisecond to 300 milliseconds. Resistor R5 and Zener diode D6 conduct to discharge capacitor C5 when it becomes charged above the threshold voltage of diode D6, and diode D5 prevents capacitor C5 from discharging through LEDs 7 which would generate light flashes.

While the principles of the invention have been set out above in connection with specific embodiments, it is to be understood that this description is merely made by way of example and not as a limitation of the scope of protection, which is determined by the appended claims.

The invention claimed is:

1. An LED lamp suitable for use in a luminaire, the LED lamp adapted for receiving electrical power from the luminaire and comprising:
   one or more LEDs;
   a ballast protection circuit including an impedance;
   a filter circuit;
   a switched-mode power supply for driving the one or more LEDs;
   one or more sensing circuits for generating at least one output, in dependence on whether the electrical power received from the luminaire indicates that the electrical power is provided via a magnetic ballast, an electronic ballast which operates as a constant current ballast, an electronic ballast which operates as a constant power ballast, or not via a ballast; and
   a plurality of switches for defining a plurality of operation modes of the LED lamp, and for switching among the plurality of operation modes in dependence on the at least one output from the one or more sensing circuits, wherein the plurality of operation modes comprise:
      a first operation mode, in which the switched-mode power supply operates at an operation frequency, the filter circuit is connected for filtering noise generated by the switched-mode power supply, and the ballast protection circuit is disconnected;
      a second operation mode, in which the switched-mode power supply does not operate, the filter circuit is disconnected, the ballast protection circuit is connected, and the impedance is bypassed; and
      a third operation mode, in which the switched mode power supply does not operate, the filter circuit is disconnected, the ballast protection circuit is connected, and the impedance is connected in series with the LEDs.

2. The LED lamp of claim 1, comprising a first power supply circuit for supplying power to the one or more LEDs via the ballast protection circuit, and a second power supply circuit for supplying power to the one or more LEDs via the filter circuit and the switched-mode power supply.

3. The LED lamp of claim 2, wherein the one or more sensing circuits comprise a first sensing circuit for generating a first output signal for operating a first switch, wherein the first switch is arranged for connecting the first power supply circuit for supplying power via the ballast protection circuit to the one or more LEDs.

4. The LED lamp of claim 3, wherein the first sensing circuit is arranged to sense a frequency of a voltage supplied by the luminaire.

5. The LED lamp of claim 3, wherein the first switch is arranged to connect the ballast protection circuit to the rectified voltage supplied to the LED lamp.

6. The LED lamp of claim 2, wherein the switched-mode power supply comprises a second sensing circuit for sensing a voltage or current supplied to the switched-mode power supply and for operating the second switch in dependence on the sensed voltage or current.

7. The LED lamp of claim 6, wherein the second sensing circuit enables operation of the switched-mode power supply when a voltage or current received by the switched-mode power supply exceeds a predetermined threshold.

8. The LED lamp of claim 6, wherein the second sensing circuit enables operation of the switched-mode power supply when the LED lamp receives operating power from the luminaire and the first power supply circuit is not connected.

9. The LED lamp of claim 2, wherein the one or more sensing circuits comprise a third sensing circuit for generating a third output signal for operating a third switch, the third switch arranged for disconnecting the filter circuit when the first power supply circuit is enabled for supplying power to the one or more LEDs.

10. The LED lamp of claim 9, wherein the third sensing circuit is arranged to sense an amplitude of a rectified voltage or current supplied to the LED lamp and generates the output signal.

11. The LED lamp of claim 9, wherein the third switch comprises an electromagnetic relay.

12. The LED lamp of claim 1, wherein the one or more sensing circuits comprise a fourth sensing circuit for generating an output signal for operating a fourth switch, the fourth switch for bypassing the impedance.

13. The LED lamp of claim 12, wherein the fourth sensing circuit is arranged to sense a voltage or current indicative of current flowing through the one or more LEDs.

14. The LED lamp of claim 12, wherein the fourth switch is arranged to switch the ballast protection circuit from a low impedance mode to a high impedance mode when the sensed voltage or current exceeds a predetermined threshold.

15. The LED lamp of claim 14, wherein impedance has an inductive impedance between 0.12 and 0.3 mH, preferably 0.18 mH.

16. The LED lamp of claim 1, further comprising an auxiliary circuit, which defines a conductive path connected in parallel with the one or more LEDs, wherein the auxiliary circuit comprises a capacitor in the conductive path arranged to bypass a burst current from the LEDs, and further comprises a circuit for discharging the capacitor not through the LEDs.

17. The LED lamp of claim 1, wherein the sensing circuit, upon receiving electrical power from the luminaire, has an impedance of at least 2 MOhm for a time period of at least 75 msec.

18. An LED lamp suitable for use in a fluorescent luminaire, wherein the LED lamp is adapted for receiving electrical power from the luminaire, the LED lamp comprising:
   one or more LEDs;
   a first power supply circuit for supplying power to the one or more LEDs via a ballast protection circuit, wherein the ballast protection circuit is switchable between a low impedance mode and a high impedance mode;
   a second power supply circuit for supplying power to the one or more LEDs via a filter circuit and a switched-mode power supply;
   one or more sensing circuits for generating at least one output, in dependence on whether the electrical power received from the luminaire indicates that the electrical power is provided via a magnetic ballast, an electronic ballast which operates as a constant current ballast, an electronic ballast which operates as a constant power ballast, or not via a ballast; and
   a plurality of switches for defining a plurality of operation modes of the LED lamp, and for switching among the plurality of operation modes in dependence on the at least one output from the one or more sensing circuits, wherein the plurality of operation modes comprise:

a first operation mode, in which the second power supply circuit operates to supply power to the one or more LEDs and the first power supply circuit does not supply power to the one or more LEDs;

a second operation mode, in which the first power supply circuit operates to supply power to the one or more LEDs, the ballast protection circuit operates in the low impedance mode, and the second power supply circuit does not supply power to the one or more LEDs; and a third operation mode, in which the first power supply circuit operates to supply power to the one or more LEDs, the ballast protection circuit operates in the high impedance mode, and the second power supply circuit does not supply power to the one or more LEDs.

19. An LED lamp suitable for use in a fluorescent luminaire, wherein the LED lamp is adapted for receiving electrical power from the luminaire, the LED lamp comprising:

one or more LEDs;

a ballast protection circuit switchable between a low impedance mode and a high impedance mode;

a filter circuit; and a switched-mode power supply for driving the one or more LEDs;

wherein the LED lamp is configured to supply power to the one or more LEDs via the ballast protection circuit operating in the low impedance mode when the LED lamp detects that the electrical power received from the luminaire is provided via an electronic ballast which operates as a constant current ballast, wherein the LED lamp is configured to supply power to the one or more LEDs via the ballast protection circuit operating in the high impedance mode when the LED lamp detects that the electrical power received from the luminaire is provided via an electronic ballast which operates as a constant power ballast, and wherein the LED lamp is configured to supply power to the one or more LEDs via the filter circuit and the switched-mode power supply when the LED lamp detects that the electrical power received from the luminaire is provided via a magnetic ballast or not via a ballast.

* * * * *